United States Patent
Ganguly et al.

(10) Patent No.: US 11,887,130 B2
(45) Date of Patent: Jan. 30, 2024

(54) COMPUTER APPLICATION CONTENT DETECTION AND FEEDBACK

(71) Applicant: INTERNATIONAL BUSINESS MACHINES CORPORATION, Armonk, NY (US)

(72) Inventors: Debasis Ganguly, Dublin (IE); Martin Gleize, Dublin (IE); Pierpaolo Tommasi, Dublin (IE); Francesca Bonin, Dublin (IE); Yufang Hou, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/948,287

(22) Filed: Sep. 11, 2020

(65) Prior Publication Data

US 2022/0084045 A1 Mar. 17, 2022

(51) Int. Cl.
*G06Q 50/00* (2012.01)
*G06Q 30/018* (2023.01)
(Continued)

(52) U.S. Cl.
CPC .......... *G06Q 30/0185* (2013.01); *G06N 5/04* (2013.01); *G06N 20/00* (2019.01); *G06Q 30/0282* (2013.01); *G06Q 50/01* (2013.01)

(58) Field of Classification Search
CPC .......... G06Q 30/0185; G06Q 30/0282; G06Q 50/01; G06N 20/00; G06N 5/04
See application file for complete search history.

(56) References Cited

U.S. PATENT DOCUMENTS 8,266,158 B2 9/2012 Glass
8,805,996 B1 8/2014 Gauvin
(Continued)

FOREIGN PATENT DOCUMENTS

EP 2777011 A1 6/2015
JP 2010266940 A 11/2010
(Continued)

OTHER PUBLICATIONS

Anand, Vishal, Ravi Shukla, Ashwani Gupta, and Abhishek Kumar. "Customized video filtering on YouTube." arXiv preprint arXiv:1911.04013 (2019) (Year: 2019).*

(Continued)

*Primary Examiner* — Gabrielle A McCormick
*Assistant Examiner* — Maame Ofori-Awuah
(74) *Attorney, Agent, or Firm* — Steven M. Bouknight

(57) ABSTRACT

A method for automatically detecting inappropriate content on a computing application is provided. The method may include, in response to detecting an attempt to post content on the computing application, parsing the content to identify parts of the content. The method may further include determining whether the parts of the content comprises inappropriate content by applying algorithms to the parts of the content based on information associated with one or more computing applications and by predicting whether potential viewers of the one or more parts of the content view the one or more parts as inappropriate. The method may further include, in response to determining that the one or more parts of the content includes inappropriate content based on the applied algorithms and the potential viewers, generating and displaying feedback and providing suggestions for editing the inappropriate content on the attempted post.

20 Claims, 6 Drawing Sheets

(51) Int. Cl.
   *G06Q 30/0282*     (2023.01)
   *G06N 20/00*     (2019.01)
   *G06N 5/04*     (2023.01)

(56) References Cited

U.S. PATENT DOCUMENTS

| | | | |
|---|---|---|---|
| 9,105,008 | B2 | 8/2015 | Popescu |
| 9,563,874 | B1* | 2/2017 | McPhie ................. G06Q 10/10 |
| 10,410,125 | B1* | 9/2019 | Finkelstein ............ G06F 16/35 |
| 2014/0359022 | A1* | 12/2014 | Buddenbaum .......... H04L 51/04 |
| | | | 709/206 |
| 2015/0039405 | A1 | 2/2015 | Frank |
| 2015/0163184 | A1 | 6/2015 | Kanter |
| 2015/0309981 | A1 | 10/2015 | Brav |
| 2015/0310571 | A1* | 10/2015 | Brav ...................... G06Q 10/00 |
| | | | 705/311 |
| 2016/0294755 | A1* | 10/2016 | Prabhu ................. H04L 51/046 |
| 2017/0223133 | A1* | 8/2017 | Joshi .................... H04L 67/306 |
| 2017/0374072 | A1* | 12/2017 | Steinberg ............... H04L 51/12 |
| 2018/0276549 | A1* | 9/2018 | Vo ...................... G06Q 30/0241 |
| 2020/0125928 | A1* | 4/2020 | Doyle .................. G06K 9/6256 |

FOREIGN PATENT DOCUMENTS

| | | |
|---|---|---|
| WO | 2013070512 A1 | 5/2013 |
| WO | 2015006797 A1 | 1/2015 |

OTHER PUBLICATIONS

Fang, et al., "A Utility Maximization Framework for Privacy Preservation of User Generated Content," ICTIR '16, Sep. 12-16, 2016, pp. 281-290, Newark, DE, USA, Retrieved from the Internet: <URL: https://dl.acm.org/doi/10.1145/2970398.2970417>.

Nematzadeh, et al., "Empirical Study on Detecting Controversy in Social Media," Cornell University, Aug. 25, 2019, 4 pages, Cited as: arXiv:1909.01093, Retrieved from the Internet: <URL: https://arxiv.org/abs/1909.01093>.

Pilkington, "Justine Sacco, PR executive fired over racist tweet, 'ashamed'," Word News—The Guardian, Dec. 22, 2013 [accessed on Jun. 3, 2020], 6 pages, Retrieved from the Internet: <URL: https://www.theguardian.com/world/2013/dec/22/pr-exec-fired-racist-tweet-aids-africa-apology>.

Robinson, "Filtering inappropriate content with the Cloud Vision API," Google Cloud Blog, Aug. 17, 2016 [accessed on Jun. 3, 2020], 7 pages, Retrieved from the Internet: <URL: https://cloud.google.com/blog/products/gcp/filtering-inappropriate-content-with-the-cloud-vision-api>.

Yenala, et al., "Deep learning for detecting inappropriate content in text," International Journal of Data Science and Analytics, / Accepted: Dec. 11, 2017 / Published online: Dec. 27, 2017, pp. 273-286, Springer, Retrieved from the Internet: <URL: https://link.springer.com/article/10.1007/s41060-017-0088-4>.

Zhitomirsky-Geffet, et al., "Utilizing overtly political texts for fully automatic evaluation of political leaning of online news websites," Emerald Insight, 2015 [accessed on Sep. 14, 2016], pp. 362-379, vol. 40, Issue 3, DOI: 10.1108/OIR-06-2015-0211, Retrieved from the Internet: http://dx.doi.org/10.1108/OIR-06-2015-0211>.

\* cited by examiner

COMPUTER APPLICATION CONTENT DETECTION AND FEEDBACK

BACKGROUND

The present invention relates generally to the field of computing, and more specifically, to data management and processing on a computing application.

Generally, individuals and businesses may rely on social networking applications for both personal use and business promotions. Specifically, social networking applications may expand one's business through promotion/advertising as well as expand one's individual contacts by providing connections with other users of the social networking applications. Social media accounts may be linked to social media platforms such as Facebook® and Instagram® (Facebook and Instagram and all Facebook-based and Instagram-based trademarks and logos are trademarks or registered trademarks of Facebook, Inc. and/or its affiliates), Twitter® (Twitter and all Twitter-based trademarks and logos are trademarks or registered trademarks of Twitter, Inc. and/or its affiliates), and LinkedIn® (LinkedIn and all LinkedIn-based trademarks and logos are trademarks or registered trademarks of LinkedIn, Inc. and/or its affiliates). Depending on the social media platform, members may be able to contact any other member and members may be allowed to create posts for other members to view. For example, individuals may create posts that include text, images, video, audio, articles, and presentations. Therefore, besides being able to just share news about your business and/or industry on a given social media platform, users may also be able to share updates about their personal life. Furthermore, it may be common for business use and personal use of social media to collide.

SUMMARY

A method for automatically detecting inappropriate content on a computing application is provided. The method may include, in response to detecting an attempt to post content on the computing application, parsing the content to identify one or more parts of the content. The method may further include determining whether the one or more parts of the content comprises inappropriate content by applying one or more algorithms to the one or more parts of the content based on information associated with one or more computing applications and by predicting whether potential viewers of the one or more parts of the content view the one or more parts as inappropriate based on the applied one or more algorithms. The method may further include in response to determining that the one or more parts of the content includes inappropriate content based on the applied one or more algorithms and the potential viewers, generating and displaying feedback and providing suggestions for editing the inappropriate content on the attempted post.

A computer system for automatically detecting inappropriate content on a computing application is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include, in response to detecting an attempt to post content on the computing application, parsing the content to identify one or more parts of the content. The method may further include determining whether the one or more parts of the content comprises inappropriate content by applying one or more algorithms to the one or more parts of the content based on information associated with one or more computing applications and by predicting whether potential viewers of the one or more parts of the content view the one or more parts as inappropriate based on the applied one or more algorithms. The method may further include, in response to determining that the one or more parts of the content includes inappropriate content based on the applied one or more algorithms and the potential viewers, generating and displaying feedback and providing suggestions for editing the inappropriate content on the attempted post.

A computer program product for automatically detecting inappropriate content on a computing application is provided. The computer program product may include one or more computer-readable storage devices and program instructions stored on at least one of the one or more tangible storage devices, the program instructions executable by a processor. The computer program product may include program instructions to, in response to detecting an attempt to post content on the computing application, parsing the content to identify one or more parts of the content. The computer program product may also include program instructions to determine whether the one or more parts of the content comprises inappropriate content by applying one or more algorithms to the one or more parts of the content based on information associated with one or more computing applications and by predicting whether potential viewers of the one or more parts of the content view the one or more parts as inappropriate based on the applied one or more algorithms. The computer program product may include program instructions to, in response to determining that the one or more parts of the content includes inappropriate content based on the applied one or more algorithms and the potential viewers, generate and display feedback and providing suggestions for editing the inappropriate content on the attempted post.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
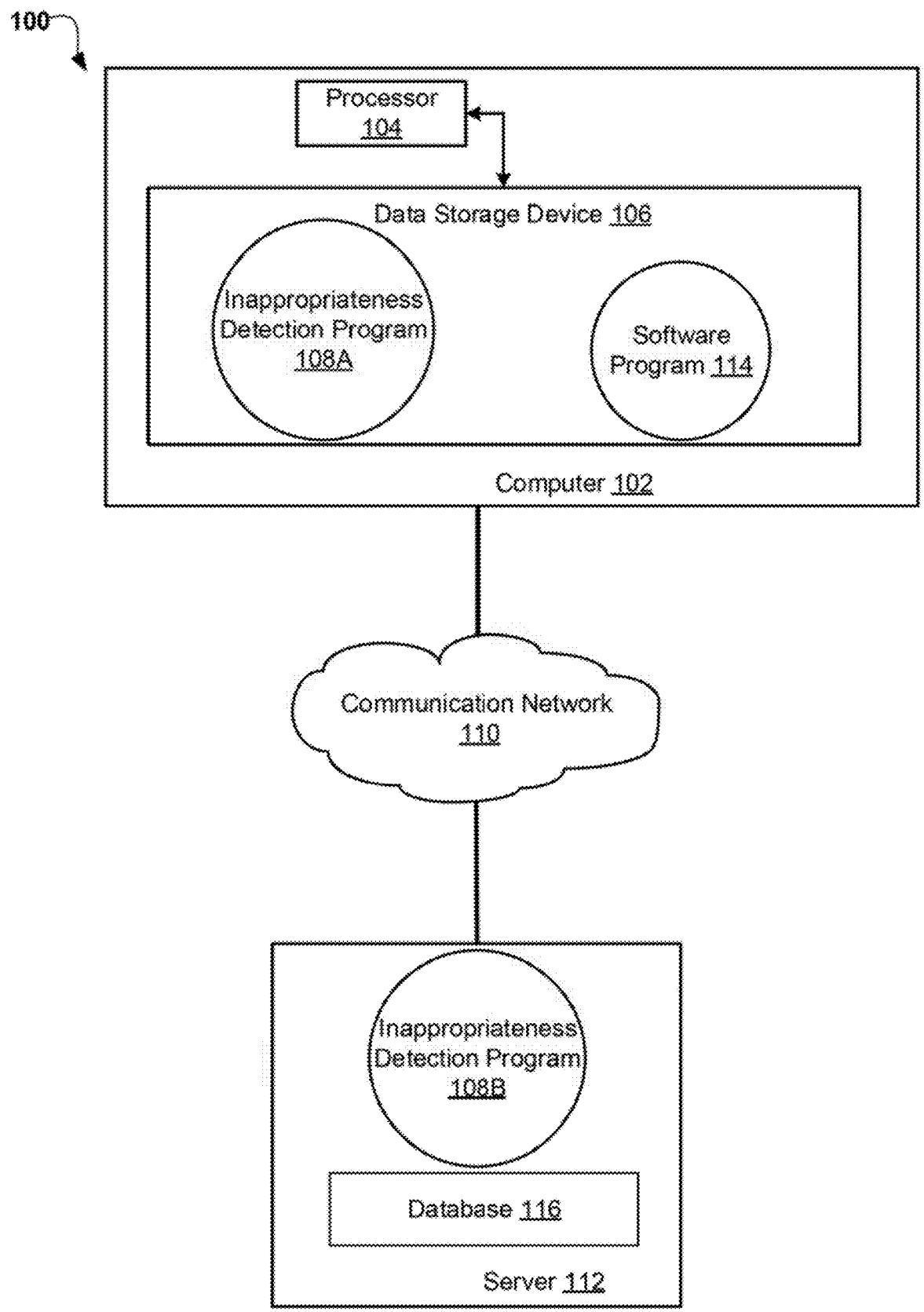
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to data processing and management. The following described exemplary embodiments provide a system, method and program product for automatically detecting inappropriate content in a user post and providing feedback to the user based on the detected inappropriateness. Specifically, the present embodiment has the capacity to improve the technical field associated with social networking applications, blog sites, and other online and/or offline social networking platforms, by analyzing a potential user post to determine whether the potential user post includes inappropriate content based on the audience that may view and/or receive the potential user post, and in turn, may provide feedback to the user based on the determination. More specifically, the system, method and computer program product may cognitively and dynamically extract information that is specific to a user's social networking accounts (provided the user grants access to the embodiment implementation to do so), as well as extract information associated with global/public news sites and applications, to develop and train algorithms that may identify the content that is determined to be inappropriate, which may also depend on potential viewers of the content. As such, in response to receiving a user's potential post on one or more of the user's social media accounts, and/or on other social networking platforms, the system, method and computer program product may cognitively and dynamically parse the potential user post to identify its content, apply the developed and trained algorithms to the parsed content to determine whether the content includes inappropriateness, and if so, provide different forms of feedback and suggestions to the user based on the determination.

As previously described with respect to social networking platforms, members may be able to contact any other member of the platform and may be allowed to create posts for other members to view. For example, individuals may create posts that include texts, images, video, audio, articles, and presentations. Also, in some cases, individuals may use a single account for personal as well as business use. However, some downsides that may be associated with posts on social networks is that some posts may be inappropriate based on its content, may offend a person or group of people who may view the posts, and in turn may embarrass or ruin the reputation of a user or business submitting the post. In an example scenario, a user A may enter a post about a topic for which the user's friends, user B and user C, have previously posted opinions on but were unbeknownst to user A and may differ from user A's opinion. Furthermore, content within user A's post may include material that users B and C may find sensitive and/or offensive. In turn, user A's post may cause anger and/or a negative reaction from user B and user C, may hurt user B and user C's feelings, as well as may cause harm to user A's reputation within the friend group involving user B and user C and/or with the public at-large. In another example scenario, a person and/or business may enter a post that, although it may be acceptable within the person's friend community or the business' community/industry associated with the person and business, it may be negatively received publicly, causing harm to the person and business' reputation.

As such, it may be advantageous, among other things, to provide a method, computer system, and computer program product for automatically detecting inappropriate content on a computing application and associated with a user-generated post, and providing feedback/suggestions to the user based on the detected inappropriateness. Specifically, in response to receiving a potential post on one or more social networking platforms, the system, method and computer program product may cognitively and dynamically parse the potential post to identify the content within the post, apply developed and trained algorithms to the parsed content to determine whether the content includes inappropriateness, and if so, provide different forms of feedback to a user that may include pointing out the inappropriateness within the potential post, identifying the person or groups of people that may be offended by the potential post, scoring the potential post, scoring parts of content within the potential post, and/or providing suggestions for improving the potential post.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, an exemplary networked computer environment 100 in accordance with one embodiment is depicted. The networked computer environment 100 may include a computer 102 with a processor 104 and a data storage device 106 that is enabled to run an inappropriateness detection program 108A and a software program 114 and may also include a microphone (not shown). The software program 114 may be an application program such as an internet browser and/or one or more mobile apps running on a client computer 102, such as a mobile phone device. The inappropriateness detection program 108A may communicate with the software program 114. The networked computer environment 100 may also include a server 112 that is enabled to run an inappropriateness detection program 108B and the communication network 110. The networked computer environment 100 may include a plurality of computers 102 and servers 112, only one of which is shown for illustrative brevity. For example, the plurality of computers 102 may include a plurality of interconnected devices, such as a mobile phone, tablet, and laptop, associated with one or more users.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the inappropriateness detection program 108A, 108B may interact with a database 116 that may be embedded in various storage devices, such as, but not limited to, a mobile device 102, a networked server 112, or a cloud storage service.

According to the present embodiment, a program, such as an inappropriateness detection program 108A and 108B may run on the client computer 102 and/or on the server computer 112 via a communications network 110. The inappropriateness detection program 108A, 108B may provide a form of reputation protection for users/members of social media platforms and other online communities by analyzing potential posts from the users/members and determining whether the potential posts contain inappropriate content that may be offensive to certain persons. Specifically, a user using a client computer 102, such as a mobile device, may run a inappropriateness detection program 108A, 108B, that may interact with a database 116 and a software program 114, such as a web browser and/or social media applications, to automatically detect inappropriate content associated with a user-generated post and provide feedback/suggestions to the user based on the detected inappropriateness. More specifically, the inappropriateness detection program 108A, 108B may cognitively and dynamically parse the potential post to identify the content within the post, apply developed models to the parsed content to determine whether the content includes inappropriateness, and if so, provide different forms of feedback to a user that may include pointing out the inappropriateness within the potential post, identifying the person or groups of people that may be potentially offended by the potential post, scoring the potential post, and/or providing suggestions for improving the potential post.

Figure 2:
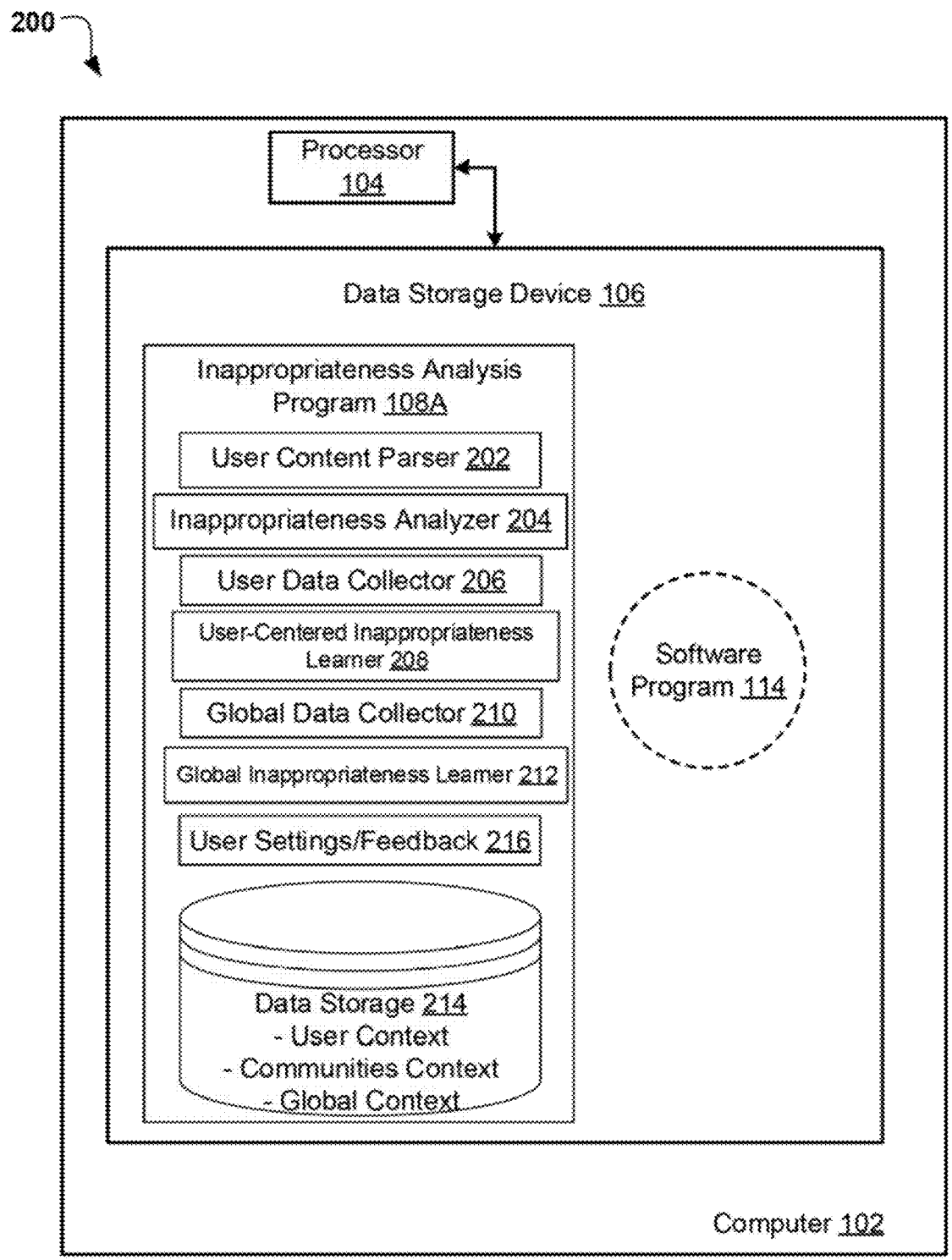
FIG. 2 is a block diagram illustrating the system architecture of an inappropriateness detection program according to one embodiment.

Referring now to FIG. 2, a block diagram 200 illustrating the system architecture of an inappropriateness detection program 108A (FIG. 1) according to one embodiment is depicted. As previously described, the inappropriateness detection program 108A, 108B may run on the client computer 102 (FIG. 1) and/or the server computer 112 (FIG. 1). For illustrative brevity, only an expanded view of the system architecture of the inappropriateness detection program 108A (FIG. 1) running on client computer 102 is shown in FIG. 2. As illustrated in FIG. 2, the inappropriateness detection program 108A may include a user content parser 202, an inappropriateness analyzer module 204, a user data collector module 206, a user-centered inappropriateness learner module 208, a global data collector module 210, a global inappropriateness learner module 212, one or more data storages 214, and a user settings and feedback module 216. As previously described, the inappropriateness detection program 108A, 108B may cognitively and dynamically extract information that is specific to a user's social networking accounts, as well as extract information associated with global/public news sites and applications, in order to develop and train a combination of natural language processing (NLP), computer vision, and machine learning algorithms to determine whether content may be viewed as inappropriate. As such, the inappropriateness detection program 108A, 108B may include, and continuously train, a user-centered inappropriateness learner 208 that may include an algorithmic model comprising a combination NLP, computer vision, and machine learning techniques used to identify and determine whether content associated with a user context and a communities context may be inappropriate. Furthermore, the inappropriateness detection program 108A, 108B may include, and continuously train, a global inappropriateness learner 212 that may include an algorithmic model comprising a combination NLP, computer vision, and machine learning techniques used to identify and determine whether content associated with a global context may be inappropriate.

Specifically, for example, the inappropriateness detection program 108A, 108B may use the user data collector 206 to cognitively and dynamically extract information associated with feeds from various user accounts such as Facebook®, Twitter®, and Instagram®. More specifically, for example, a user may use login credentials to access each of the different social media accounts, and the inappropriateness detection program 108A, 108B may detect and store the user's login credentials enabling continued access to the user's social media account. According to one embodiment, the inappropriateness detection program 108A, 108B may present one or more pop-up notifications asking the user to grant the inappropriateness detection program 108A, 108B access/permission to certain information associated with the user's social media accounts. Thereafter, the inappropriateness detection program 108A, 108B may use the user data collector 206 to extract information associated with the user's social media accounts using one or more data extracting/mining techniques. For example, the inappropriateness detection program 108A, 108B may use the user data collector 206 to extract information such as friends and groups associated with the user, a user's previous posts and comments (whereby posts and comments may include content such as text, images, video, sound, weblinks, articles etc.), previous and current posts and comments from the user's friends, previous and current posts and comments from groups which the user may be a member, and other posts and comments that may be associated with specific communities and/or present in a user's daily news feed on the social media account.

Thereafter, the inappropriateness detection program 108A, 108B may use the user-centered inappropriateness learner 208 to identify and determine what types of content may be deemed as inappropriate in a user context (i.e. based on a user feed, user friends, and user groups) in a community context (i.e. based on user communities that the user may belong to), and based on potential viewers of the content in the user context and communities context. According to one embodiment, the user friends and the user groups may include friends that the user has become friends with and groups that the user has joined on a social media platform, respectively. Also, according to one embodiment, and as will be further explained, user communities may include communities that the inappropriateness detection program 108A, 108B has determined that the user may be member of based on content associated with the user's posts, comments, and interest on a social media platform. The user-centered inappropriateness learner 208 may use a combination of natural language processing (NLP) techniques, computer vision, and machine learning techniques to analyze the extracted information and, in turn, use the extracted and analyzed information to develop and continually train the user-centered inappropriateness learner 208. For example, the user-centered inappropriateness learner 208 may use NLP techniques and computer vision techniques such as name entity recognition, sentiment analysis, text summarization, speech-to-text analysis, aspect mining, topic modeling, bag of words, image classification, object detection, object tracking, semantic segmentation, instance segmentation, and image reconstruction, respectively. The user-centered inappropriateness learner 208 may also, for example, use machine learning techniques such as decision tree, random forest tree, linear regression, and logistic regression. Then, the user-centered inappropriateness learner 208 may be used to determine whether content is inappropriate based on the user context and the community context.

Specifically, the inappropriateness detection program 108A, 108B may apply the NLP, computer vision, and machine learning techniques associated with the user-centered inappropriateness learner 208 to the content extracted from previous and/or current posts and comments from a user, the user's friends, the user's groups, and communities associated with the user on social media platforms. In turn, the inappropriateness detection program 108A, 108B may use the extracted content from the posts/comments and the analysis of the extracted content from the NLP, computer vision, machine learning techniques to generate an algorithmic model that may be included in the user-centered inappropriateness learner 208. More specifically, the user-centered inappropriateness learner 208 may include an algorithmic model comprising a combination of the NLP, computer vision, and machine learning techniques along with the analyzed extracted content. Therefore, in turn, the algorithmic model associated with the user-centered inappropriateness learner 208 may, for example, be a collection of determinations based on potential viewers of the content and viewer reactions, based on analyzed content, analyzed friend and group sentiments/reactions based on the analyzed content, analyzed community sentiments/reactions based on the analyzed content, and determined statistics associated with the analyzed content on the user's social media accounts. As such, the user-centered inappropriateness learner 208 may be used to predict whether content is inappropriate which may also be based on the types of sentiments/reactions the user's friends, groups, and communities may have in response to the content.

For example, using the user-centered inappropriateness learner 208, the inappropriateness detection program 108A, 108B may determine/predict, based on extracted and analyzed information, the different of types of reactions persons may have to content in a potential post such as predicting whether a friend, group, and/or community may find certain content inappropriate based on previous posts and reactions from the friend, group, and/or community. More specifically, for example, the inappropriateness detection program 108A, 108B may determine that a majority (i.e. >50%) of the user's friends may not like a potential post, or may find specific content within the potential post inappropriate, based on a detection from the user-centered inappropriateness learner 208 that a majority of the user's friends who have commented on similar posts express some type of distaste and/or other negative reactions to the specific content. The inappropriateness detection program 108A, 108B may also make more individual determinations using the user-centered inappropriateness learner 208, such as specifically identifying by name the friends and/or groups associated with the user's social media that may find the identified content inappropriate. The inappropriateness detection program 108A, 108B may also make individual statistical determinations such as by determining, for example, that 96% of a user's Native American friends may find content within a potential post inappropriate based on previously expressed opinions from the user's Native American friends regarding similar content.

Also, for example, the inappropriateness detection program 108A, 108B may determine whether other communities associated with the user may or may not find the content inappropriate in a communities context. As previously described, the inappropriateness detection program 108A, 108B may have identified certain friends and groups within a social media platform that the user may have directly become friends with or a group where the user has directly become a member (i.e. accepted a friend request, joined a group, respectively). Additionally, and according to one embodiment, the inappropriateness detection program 108A, 108B may also determine certain communities with which the user may belong based on content associated with the user and the user's specific interest. For example, using the user-centered inappropriateness learner 208, the inappropriateness detection program 108A, 108B may detect that the user may post about a certain topic such as football, comment on other posts involving football, and/or click on certain posts and articles in the user's news feed regarding football. As such, the inappropriateness detection program 108A, 108B may generate a community and/or determine that the user may belong to a community such as a football community and/or a fan community of a specific team. Therefore, in addition to determining whether certain friends and groups may find certain content in a potential post inappropriate, the inappropriateness detection program 108A, 108B may also determine whether certain communities associated with the user may find the content inappropriate as well. For example, based on the algorithmic model associated with the user-centered inappropriateness learner 208, the inappropriateness detection program 108A, 108B may determine that while a majority of friends may find a certain piece of content inappropriate, friends within the user's football fan community may not find the certain piece of content inappropriate and may have even had a positive reaction to the certain piece of content.

As previously described, the inappropriateness detection program 108A, 108B may use the analysis from the NLP, computer vision, and machine learning techniques to continuously train and update the user-centered inappropriateness learner 208. Therefore, the user-centered inappropriateness learner 208 may be ever-changing and adapting to the content and reactions identified in the user's social media accounts on a real-time basis and/or on a scheduled basis (such as hourly, daily, weekly, monthly, etc.). Additionally, according to one embodiment, the inappropriateness detection program 108A, 108B may include multiple user-centered inappropriateness learner models 208 with each one associated with a specific social media account and/or platform, and/or may include one singular user-centered inappropriateness learner model 208 that may be applied to all social media accounts and platforms. Furthermore, the content associated with the user context and the communities context that is extracted and analyzed by the inappropriateness detection program 108A, 108B may be stored on a data storage 214.

Similar to the extraction and analysis process associated with information and content that is specific to a user's social media and other accounts, the inappropriateness detection program 108A, 108B may use the global data collector 210 to cognitively and dynamically extract information associated with feeds from various publicly available websites, applications, blogs, and other online public resources. As previously described, the inappropriateness detection program 108A, 108B may extract information from sites and applications that are specific to a user, such as sites and applications that may require user login credentials and/or that are privately operated by a user. As such, the user-centered inappropriateness learner 208 may provide determinations regarding inappropriateness based on information specifically viewable by the user (or restricted to user access only) on the user's social media and other accounts. Therefore, in addition, the inappropriateness detection program 108A, 108B may use the global inappropriateness learner 212 to provide determinations regarding inappropriateness based on information available to the public. Specifically, the inappropriateness detection program 108A, 108B may use the global data collector 210 to detect and extract information from publicly viewable websites and application such as online public news feeds, online public articles, online public comments, online and publicly available images (pictures, memes, etc.), online public videos, online public blogs, podcasts and other publicly available online resources. For example, the inappropriateness detection program 108A, 108B may track and extract information associated with nationally trending news topics by monitoring certain news websites and applications such as CNN® (CNN and all CNN-based trademarks and logos are trademarks or registered trademarks of CNN, Inc. and/or its affiliates) and extracting public reactions and comments to the trending news topic. According to one embodiment, a post on a user-specific social media account may also be public information if the user/business decides to make their profile and/or posts publicly available. Therefore, there may be some overlap between the information collected by the user data collector 206 and the global data collector 210. Also, similar to the user data collector 206, the global data collector 210 may use one or more known data mining/extracting techniques to extract the publicly available information.

Thereafter, the inappropriateness detection program 108A, 108B may use the global inappropriateness learner 212 to identify and determine what types of content may be deemed as inappropriate based on a global context (i.e. based on the sentiments of the general population and/or based on globally identifiable communities or groups of people), and potential viewers of the content in a global context. Specifically, in response to extracting the global/public information, the global inappropriateness learner 212 may use a combination of natural language processing (NLP) techniques, computer vision techniques, and machine learning techniques to analyze the extracted global information and, in turn, use the analyzed and extracted global information to continually train the global inappropriateness learner 212 to determine whether content is inappropriate based on the global context. For example, the global inappropriateness learner 212 may use NLP techniques and computer vision techniques such as name entity recognition, sentiment analysis, text summarization, speech-to-text analysis, aspect mining, topic modeling, bag of words, image classification, object detection, object tracking, semantic segmentation, instance segmentation, and image reconstruction, respectively. The global inappropriateness learner 212 may also, for example, use machine learning techniques such as decision tree, random forest tree, linear regression, and logistic regression.

As such, the inappropriateness detection program 108A, 108B may apply the NLP, computer vision, and machine learning techniques associated with the global inappropriateness learner 208 to the extracted global content from previous and/or current news streams/feeds, online articles and publicly available comments associated with the online articles, publicly available social media posts and comments, online publicly available images (pictures, memes, etc.), online videos, online blogs, podcasts and other resources. In turn, the inappropriateness detection program 108A, 108B may use the extracted global information and the analysis of the extracted global information from the NLP, computer vision, and machine learning techniques to generate an algorithmic model that may be included in the global inappropriateness learner 212. More specifically, the global inappropriateness learner 212 may include an algorithmic model comprising a combination of the NLP, computer vision, and machine learning techniques along with the analyzed extracted global content. Therefore, the algorithmic model associated with the global inappropriateness learner 212 may, for example, be a collection of determinations based on potential viewers of the content and viewer reactions, based on analyzed global content, analyzed global sentiments/reactions based on the analyzed global content, and determined statistics associated with the analyzed global content. In turn, the global inappropriateness learner 212 may be used to predict whether content is inappropriate, and the types of sentiments/reactions global communities may have in response to a post containing the content. For example, using the global inappropriateness learner 212, the inappropriateness detection program 108A, 108B may predict, based on extracted and analyzed information, different types of reactions global communities may have towards content associated with a potential post such as predicting whether a global community may find a potential user post inappropriate. More specifically, for example, the inappropriateness detection program 108A, 108B may detect that a majority (i.e. >50%) of the global population may not like a potential post, or may find that specific content within a potential post is inappropriate, based on a detection from the global inappropriateness learner 212 that a majority of the global population expressing opinions on similar content (i.e. articles/news/posts) have expressed distaste and/or other negative reactions to the specific content. The inappropriateness detection program 108A, 108B may also make more individualized global community detections using the global inappropriateness learner 212, such as statistically identifying specific communities and/or groups of people that may find the identified content inappropriate. For example, the global inappropriateness learner 212 may statistically find that 90% of the Asian-American community may find certain content in a potential post inappropriate.

In turn, like the user-centered inappropriateness learner model 208, the global inappropriateness learner model 212 may be applied to potential user-generated posts to identify content within the potential post that may be deemed inappropriate and to whom it may be deemed inappropriate. More specifically, and as will be described with more detail in FIG. 3, in response to detecting and receiving a user-generated potential post, the inappropriateness detection program 108A, 108B may use the user content parser 202 to parse the user-generated potential post and determine the contents associated with the user-generated potential post. Thereafter, in response to identifying the content associated with the user-generated potential post, the inappropriateness detection program 108A, 108B may use the inappropriateness analyzer 204 to identify the content that may be deemed inappropriate by applying the algorithmic models associated with both the user-centered inappropriateness learner model 208 and the global inappropriateness learner model 212. Specifically, the user-centered inappropriateness learner model 208 and the global inappropriateness learner model 212 may be used to provide determinations on which parts of the identified content in the user-generated potential post may be deemed inappropriate and to whom it may be deemed inappropriate based on a user context, a community context, and a global context as described above.

As previously described, and similar to the user-centered inappropriateness learner model 208, the global inappropriateness learner 212 may be ever-changing and adapting to the content and reactions identified in the extracted global content on a real-time basis and/or on a scheduled basis (such as hourly, daily, weekly, monthly, etc.). Furthermore, the content associated with the global context that is extracted and analyzed by the inappropriateness detection program 108A, 108B may be stored on data storage 214. Also, and as will be discussed in more detail with respect to FIG. 3, the inappropriateness detection program 108A, 108B may include a user feedback module 216 whereby a user may be enabled to provide feedback regarding the determinations returned by the inappropriateness analyzer 204.

Figure 3:
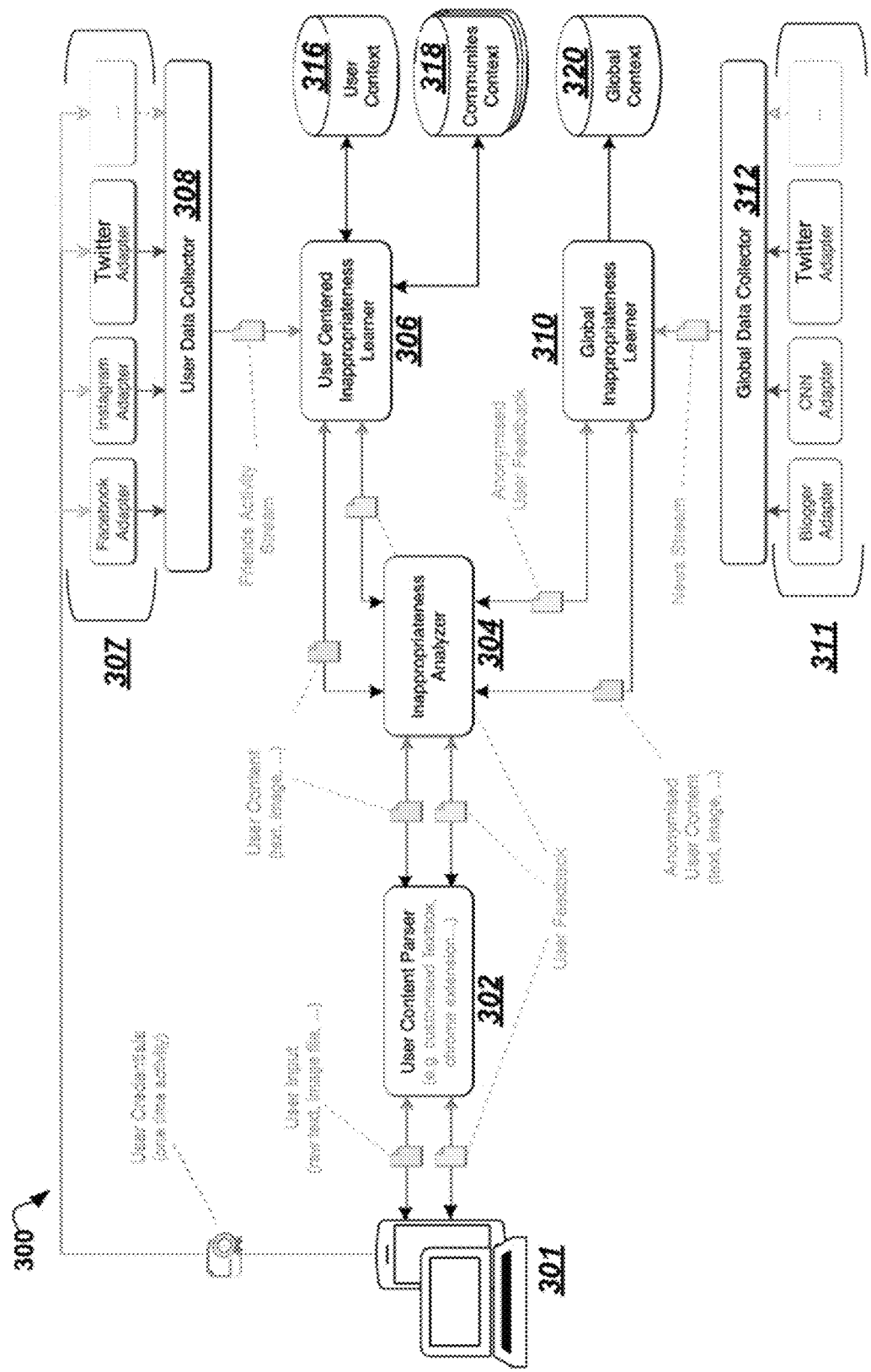
FIG. 3 is an operational flowchart illustrating the steps carried out by a program for automatically detecting inappropriate content associated with a potential post and providing feedback and suggestions based on the detected inappropriateness according to one embodiment.

Referring now to FIG. 3, an operational flowchart 300 illustrating the steps carried out by a program for automatically (i.e. in real-time) detecting inappropriate content associated with a post and providing feedback/suggestions to the user based on the detected inappropriateness according to one embodiment is depicted. Specifically, at 302, in response to detecting that a user using a computing device 301 is attempting to post content (such as a status or comment) on a software program 114 (FIG. 1), such as a web browser and/or an app, the inappropriateness detection program 108A, 108B (FIG. 1) may parse and identify the content associated with the potential post using user content parser 202 to initiate analysis on the content. As previously described in FIG. 1, the inappropriateness detection program 108A (FIGS. 1 and 2) may run on client computer 102, 301 along with one or more software programs 114 (FIG. 1). The one or more software programs 114 (FIG. 1) may include application programs such as web browsers and apps running on client computer 102, 301. The inappropriateness detection program 108A (FIG. 1) may interact with the one or more software programs 114, and/or may be an extension of the software program 114 (such as a web extension on a web browser), whereby certain actions on the software program 114 may generate/trigger notifications that may be received by the inappropriateness detection program 108A (FIG. 1). For example, the inappropriateness detection program 108A, 108B (FIG. 1) may receive a notification and/or trigger from a social media app such as Twitter® that a user has entered content (i.e. text, image, video, article, and/or sound) into a text box associated with Twitter® and clicked on an "Enter" key in an attempt to post the content for the user's followers and/or the public to read. Thus, in response to the trigger, and before allowing the user-generated post to be posted on the Twitter® platform, the inappropriateness detection program 108A, 108B (FIG. 1) may initialize a determination of whether the post includes inappropriate content by first parsing the post to identify the content. According to one embodiment, the user content parser may use known data parsing techniques, and/or a combination of natural language processing and computer vision techniques to parse the potential post.

Thereafter, at 304, in response to identifying the content associated with the potential post using the user content parser at 302, the inappropriateness detection program 108A, 108B (FIG. 1) may use the inappropriateness analyzer to determine whether the identified content may be inappropriate. As previously described, the inappropriateness detection program 108A, 108B (FIG. 1) may include an inappropriateness analyzer 304 (FIG. 2) that may analyze a user's potential post by first applying the algorithmic models associated with both the user-centered inappropriateness learner 306 and the global inappropriateness learner 310 to the identified content to cognitively and dynamically identify content that may be considered inappropriate based on a user context, community context, and global context.

Specifically, and as described at step 306 in FIG. 3, the inappropriateness detection program 108A, 108B may use, and/or have previously used, the user data collector 308 to cognitively and dynamically extract information associated with various user-specific accounts 307 such as Facebook®, Twitter®, Instagram®, etc. For example, a user may use different login credentials to access each of the different social media accounts 307, and the inappropriateness detection program 108A, 108B may detect and store the user's login credentials to enable continued access to the user's social media accounts. According to one embodiment, and as previously described, the inappropriateness detection program 108A, 108B may ask for permissions from the user to access the user's social media accounts and activity on the accounts.

Thereafter, the inappropriateness detection program 108A, 108B may use the user data collector 308 to extract information associated with the user's social media accounts. Specifically, the inappropriateness detection program 108A, 108B may use the user data collector 308 to extract information that may include content associated with a user's previous posts and comments, content within previous and current posts and comments from the user's friends, content within previous and current posts and comments from groups which the user may be a member, and content associated with community posts/comments that may relate to the user, the user's interest, and/or be presented in a user's daily news feed. Next, the inappropriateness detection program 108A, 108B (FIG. 1) may feed the extracted information to the user-centered inappropriateness learner 306 for analysis and training in a process previously described in FIG. 2.

As such, in response to receiving the parsed content from the user content parser at 302, the inappropriateness analyzer 304 may be triggered to apply the user-centered inappropriateness learner 306 to the parsed content to determine whether the content may be inappropriate based on a user context and a community context (i.e. based on information associated with the user, the user's news feeds, the user's friends, the user's groups, and determined user communities). For example, the inappropriateness detection program 108A, 108B may have detected via NLP/computer vision/machine learning techniques and the user content parser at 302 that the user's potential post on Twitter® includes a video of a football play in a football game in which a football player is hit by an opposing defender and a user's caption describing an opinion about a controversial penalty being called. The potential post may specifically include text entered by the user, which accompanies the video, that expresses anger (and/or a negative tone) towards the controversial penalty being called (indicating that the user is not in favor of the penalty). Also, the team name may be mentioned in the entered text indicating to the inappropriateness detection program 108A, 108B that the user may be a fan of the team associated with the opposing defender. In response to receiving the parsed text and parsed video at the inappropriateness analyzer 304, the inappropriateness analyzer 304 may in turn apply the user-centered inappropriateness learner 306 to the parsed content to determine whether the text regarding the negative tone towards the controversial penalty, parts of the text (such as the team name), and whether the accompanying video showing the football hit (or parts of the video) may be considered inappropriate by the user's friends, groups, and communities on Twitter®.

Accordingly, in response to the analysis by the user-centered inappropriateness learner 306 and based on any current and/or previously extracted and analyzed information stored on the user context database 316, the inappropriateness detection program 108A, 108B may determine that the majority (i.e. >50%, or more than half) of the user's friends who have commented and/or expressed opinions on the controversial penalty are also not in favor of the penalty being called, however, that the majority (i.e. >50%, or more than half) of the user's friends find that video content which is similar to the video content of a hit player is disturbing. The analysis by the user-centered inappropriateness learner 306 may also find that specific friends who are fans of the team that benefitted from the penalty being called and that have expressed (i.e. posted or commented) opinions on the matter find that they are in favor of the controversial penalty being called and that the video showing the player getting hit is distasteful. Also, for example, the inappropriateness detection program 108A, 108B may detect, based on the user-centered inappropriateness learner 306, that 100% of the user's Native American friends on Twitter® find the team name to be inappropriate.

Furthermore, according to one embodiment, based on the mentioning of the team name in the potential post and/or based on one or more previous posts by the user on Twitter® (and/or on other platforms), the inappropriateness detection program 108A, 108B (FIG. 1) may detect that the user may be part of a community that supports the football team. Therefore, the inappropriateness detection program 108A, 108B (FIG. 1) may extract and analyze information associated with a community that includes other users on Twitter® who are also fans of the football team. In turn, based on the extracted and analyzed information stored on the communities context database 318, the user-centered inappropriateness learner 306 may, for example, determine that while a majority of members are also not in favor of the penalty being called, the majority of the football team community have found similar videos to be disturbing/distasteful.

Similarly, in response to receiving the parsed content from the user content parser at 302, the inappropriateness analyzer 304 may also be triggered to apply the global inappropriateness learner 310. As previously described in FIG. 2 and here in FIG. 3, the inappropriateness detection program 108A, 108B may use the global data collector 312 to cognitively and dynamically extract information associated with various feeds from publicly available websites, applications, blogs, and other online public resources. Thus, while the inappropriateness detection program 108A, 108B may use the user data collector 308 and user-centered inappropriateness learner 306 to extract and analyze information specific to certain user accounts, the inappropriateness detection program 108A, 108B may use the global data collector 312 to detect and extract information from global/public streams and feeds such as content related to online articles, publicly available comments associated with the online articles, online and publicly available images (pictures, memes, etc.), online videos, online blogs, podcasts and other publicly available online resources. For example, the inappropriateness detection program 108A, 108B may track and extract information associated with nationally trending news topics by monitoring certain news sites, applications, and feeds such as the CNN® website and the Twitter® trending news topic feed 311, and thereby extract public reactions and comments to the trending feeds. Next, the inappropriateness detection program 108A, 108B (FIG. 1) may feed the extracted information to the global inappropriateness learner 310 for analysis and training in a process previously described in FIG. 2.

In turn, in response to receiving the parsed content from the user content parser at 302, the inappropriateness analyzer 304 may be triggered to apply the global inappropriateness learner 310 to the parsed content to determine whether the content may be inappropriate based on a global context (i.e. based on the sentiments of the general population and/or based on a globally identifiable community or group of people). As stated from the previous example, the inappropriateness detection program 108A, 108B may have detected via the user content parser at 302 that the user's potential post on Twitter® includes a video and a caption describing a controversial penalty in which a football player is hit by an opposing defender. The potential post may also include text entered by the user, which accompanies the video, that expresses anger (and/or a negative tone) towards the controversial penalty being called, whereby the team name may also be mentioned in the entered text indicating to the inappropriateness detection program 108A, 108B that the user may be a fan of the team associated with the opposing defender. In response to receiving the parsed text and parsed video at the inappropriateness analyzer 304, the inappropriateness analyzer 304 may apply the user-centered inappropriateness learner 306 as previously described above, and may also apply the global inappropriateness learner 310 to the parsed content to determine whether the text regarding the negative tone towards the controversial penalty, parts of the text (such as the team name), and whether the accompanying video showing the football hit (or parts of the video) may be considered inappropriate based on the global population and/or one or more global communities.

Accordingly, in response to the analysis by the global inappropriateness learner 310 and based on any currently and previously extracted and analyzed information stored on the global context database 320, the inappropriateness detection program 108A, 108B may determine that there are varying opinions on the controversial penalty globally, for example, some website polls may indicate that a majority of people are in favor of the penalty while other website polls may indicate that a majority of people are not in favor of the penalty. In turn, this may indicate to the inappropriateness detection program 108A, 108B that the user's text regarding their negative tone towards the penalty being called may be appropriate globally. However, the inappropriateness detection program 108A, 108B may also determine that the majority of the global population who may follow football, and/or who have commented and expressed opinions on similar content involving hits on football players, find that such videos are disturbing. The determination by the global inappropriateness learner 310 may, for example, be based on online articles, news feeds, and reactions regarding player concussions and player safety. Also, for example, the inappropriateness detection program 108A, 108B may detect, based on the global inappropriateness learner 310, that 86% of the global Native American community finds the team name to be inappropriate.

Thereafter, the inappropriateness detection program 108A, 108B may feed the determinations/findings made by the user-centered inappropriateness learner 306 and the global inappropriateness learner 306 back to the inappropriateness analyzer 304 for processing. Specifically, the inappropriateness analyzer 304 may further analyze the determinations using natural language processing and machine learning techniques to in turn generate feedback/suggestions that may be displayed to the user on the computing device 301. More specifically, and as previously described, in response to determinations that content associated with a potential user post may be inappropriate, the inappropriateness detection program 108A, 108B may provide one or more combinations of different forms of feedback to a user that may, for example, include pointing out (for example, highlighting) the content considered to be inappropriate within the potential post, identifying the person or groups of people that may be potentially offended by the potential post, identifying previous post and/or comments that contributed to the determinations, scoring the potential post and/or different parts of the content within the potential post, and/or providing suggestions for editing/improving the potential post.

Thus, continuing from the previous example, the user-centered inappropriateness learner 306 may determine that the majority (i.e. >50%, or more than half) of the user's friends who have commented and/or expressed opinions on similar content may determine that the majority (i.e. >50%, or more than half) of the user's friends who have commented and/or expressed opinions on the controversial penalty are also not in favor of the penalty being called but find the video disturbing, may point to specific friends that have expressed (i.e. posted or commented about) that they are in favor of the penalty being called and that those type of videos are distasteful, and may detect that 100% of the user's Native American friends on Twitter® find the team name to be inappropriate. Therefore, the inappropriateness detection program 108A, 108B may use the inappropriateness analyzer 304 to determine to present a first pop-up window (or dialogue box) that points to and/or highlights the video and includes text that says, "A majority of your Twitter® followers may find this video inappropriate." Also, for example, the inappropriateness detection program 108A, 108B may determine to present in the first pop-window (or in another second pop-up window) one or more previous posts and/or comments from the user's Twitter® followers who have expressed negative reactions to similar video content. Furthermore, the inappropriateness detection program 108A, 108B may highlight the entered text expressing a negative tone towards the penalty being called, and may present with the highlighted text a pop-up window (i.e. the first pop-up window, the second pop-window, or another third pop-window) that may include a list of the specific names of friends that may find the text inappropriate based on previous posts/comments and on the specific friends being fans of the other team that benefitted from the penalty. The inappropriateness detection program 108A, 108B may also highlight the text that includes the team name and present with the highlighted text one of the aforementioned pop-up windows, or a separate pop-up window, that provides a statement indicating that 100% of the user's Native American friends on Twitter® find the team name to be inappropriate (and may also list the names the user's Native American friends).

Similarly, and as previously described, the global inappropriateness learner 310 may have determined that the majority of the global population who may follow football, and/or who have commented and expressed opinions on similar content involving hits on football players, find that such videos are disturbing, and that 86% of the global Native American community finds the team name to be inappropriate. Therefore, the inappropriateness detection program 108A, 108B may use the inappropriateness analyzer 304 and determine to present a pop-up window (which may be one of the aforementioned pop-windows or a new window) that points to and/or highlights the video and includes text that says, "A majority of the global population may find this video inappropriate." Also, for example, the inappropriateness detection program 108A, 108B may determine to present in the pop-window, or in a new pop-up window, one or more links to online articles and/or previous posts/comments that contributed to the determination that the video content may be inappropriate. The inappropriateness detection program 108A, 108B may also highlight the text that includes the team name and present with the highlighted text one of the aforementioned pop-up windows, or a separate pop-up window, that provides a statement indicating that 86% of the global Native American community finds the team name to be inappropriate.

According to one embodiment, the inappropriateness detection program 108A, 108B may use the inappropriateness analyzer 304 to score the potential post, whereby scoring the potential post and/or specific content within the potential post may indicate a level of determined inappropriateness associated with the potential post. Specifically, the inappropriateness detection program 108A, 108B may score the potential post based on a combination of the determinations from the user-centered inappropriateness learner 306 and the global inappropriateness learner 306 regarding the inappropriateness of the content associated with the potential post. Also, according to one embodiment, the scoring may be based on a scale of −1 to 1, whereby −1 may indicate that the potential post and/or content within the potential post is highly inappropriate, whereby 0 may indicate that the potential post and/or content within the potential post is moderately inappropriate, and whereby 1 may indicate that the potential post and/or content within the potential post is appropriate. Furthermore, according to one embodiment, the score may be an overall score for the potential post, may be two separate scores with one score based on the determination from the user-centered inappropriateness learner 306 and another score based the global inappropriateness learner 306, and/or may be three separate scores with one score based on the user context, another score based the community context, and a further score based on the global context. Continuing from the previous example, using the inappropriateness analyzer 304, the inappropriateness detection program 108A, 108B may determine an overall score of −1 for the potential user post on Twitter® based on the user-centered inappropriateness learner 306 and the global inappropriateness learner 306 determining that multiple people and/or groups may find that the video content and the mentioning of the team name are inappropriate. However, according to one embodiment, the inappropriateness detection program 108A, 108B may present a separate score for the video content and a separate score of the text content, whereby the text content may receive a score of 0 (moderately inappropriate) simply based on the mentioning of the team name, while the video content may receive a score of −1 (highly inappropriate) based on the multiple people and/or groups that may find that the video content is inappropriate.

Additionally, and as previously described, the inappropriateness detection program 108A, 108B may cognitively provide suggestions for improving the potential post. Specifically, in response to finding that content may be inappropriate, the inappropriateness detection program 108A, 108B may use the inappropriateness analyzer 304 to cognitively determine and present suggestions on ways the user can revise the content in order for the content to not be inappropriate to a given audience. According to one embodiment, the suggestions may be based on the extracted and analyzed content associated with the user-centered inappropriateness learner 306 and the global inappropriateness learner 306. For example, and as previously described, the extracted and analyzed content associated with the user-centered inappropriateness learner 306 and the global inappropriateness learner 306 may include, among other information, previous posts and comments that may express the sentiments of various individuals regarding the content associated with the potential user post. As such, the inappropriateness analyzer 304 may use natural language processing techniques to further analyze the previous posts/comments and other information to determine suggestions for revising the content, whereby the suggested revisions may, for example, include deleting content, changing words associated with the content, adding words and/or context to the content, and/or other add/edit/delete options. Continuing from the previous example, where the user-centered inappropriateness learner 306 and the global inappropriateness learner 306 both found that a high percentage Native Americans may find the team name inappropriate, the inappropriateness analyzer 304 may determine to highlight the text including the team name and present with the highlighted text a suggestion in a pop-window indicating to the user via text that the user should delete the team name from the potential post. Also, for example, the inappropriateness analyzer 304 may determine to highlight the video content and present with the highlighted video content a suggestion in a pop-window indicating to the user via text that the user should delete the video content from the potential post.

Thereafter, the inappropriateness detection program 108A, 108B may provide and display on the computing device 30 the feedback/suggestions for the potential user post based on the determination from the inappropriateness analyzer 304. According to one embodiment and as indicated above, the inappropriateness detection program 108A, 108B may present the feedback/suggestions on the potential post by highlighting content, presenting one or more pop-windows associated with the content, or a combination of both. For example, the inappropriateness detection program 108A, 108B may present one pop-up window (or dialogue box) that includes the different feedback/suggestions or present a combination of pop-windows with each pop-up window corresponding to each of the different types of feedback. Also, according to one embodiment, the inappropriateness detection program 108A, 108B may use different colors for the pop-up windows to distinguish the different types of feedback. For example, the inappropriateness detection program 108A, 108B may present one color for a pop-up window that includes all of the different types of feedback, present two different colors for two different pop-windows (respectively) with one color indicating feedback based on the determination from the user-centered inappropriateness learner 306 and another color indicating feedback based on the determination from the global inappropriateness learner 310, and/or present three different colors for three different pop-windows (respectively) with one color indicating feedback based on the user context, another color indicating feedback based the community context, and a further color indicating feedback based on the global context. Furthermore, according to one embodiment, the inappropriateness detection program 108A, 108B may highlight content (such as text entered by the user in the potential post) and may only present the pop-up window, or pop-up windows, in response to the user scrolling over the highlighted portions of the content.

Furthermore, according to one embodiment, the inappropriateness detection program 108A, 108B may provide the user with an option to select and/or restrict the type of feedback/suggestions provided by the inappropriateness detection program 108A, 108B. For example, and as previously described, the inappropriateness detection program 108A, 108B may include a user settings and feedback module 216. According to one embodiment, the user settings and feedback module 216 may present a graphical user interface (GUI) on the computing device 301 to enable the user to select the type of feedback that may be provided by the inappropriateness detection program 108A, 108B. For example, the user settings and feedback module 216 may include in the GUI a menu with selections listing the types of feedback/suggestions the user may receive, such as feedback based on a user context, feedback based on a communities context, feedback based on a global context, and/or feedback based on the user-centered inappropriateness learner 306 and feedback based on the global inappropriateness learner 310. At this menu, the user may be enabled to select and deselect the types of feedback received by the inappropriateness detection program 108A, 108B. For example, the user may select to receive feedback/suggestions based on a user context and a global context but may deselect receiving feedback based on a community context.

Additionally, the inappropriateness detection program 108A, 108B may give the user an option to provide user feedback to the inappropriateness detection program 108A, 108B, whereby the user feedback may be provided to the user-centered inappropriateness learner 306 and the global inappropriateness learner 310 for further training. Specifically, and according to one embodiment, when presenting the feedback/suggestions from the user-centered inappropriateness learner 306 and the global inappropriateness learner 310, the inappropriateness detection program 108A, 108B may optionally provide a pop-window where the user may select whether they agree or disagree with the feedback and suggestions (however, the inappropriateness detection program 108A, 108B may not block the user from posting any content). The inappropriateness detection program 108A, 108B may also provide in the GUI a section where the user may enter feedback regarding the inappropriateness detection program 108A, 108B and the feedback/suggestions provided by the inappropriateness analyzer 304. In turn, the user feedback may be incorporated into the user-centered inappropriateness learner 306 and the global inappropriateness learner 310 for training the user-centered inappropriateness learner 306 and the global inappropriateness learner 310 in providing future feedback and suggestions.

It may be appreciated that FIGS. 1-3 provide only illustrations of one implementation and does not imply any limitations with regard to how different embodiments may be implemented. Many modifications to the depicted environments may be made based on design and implementation requirements.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
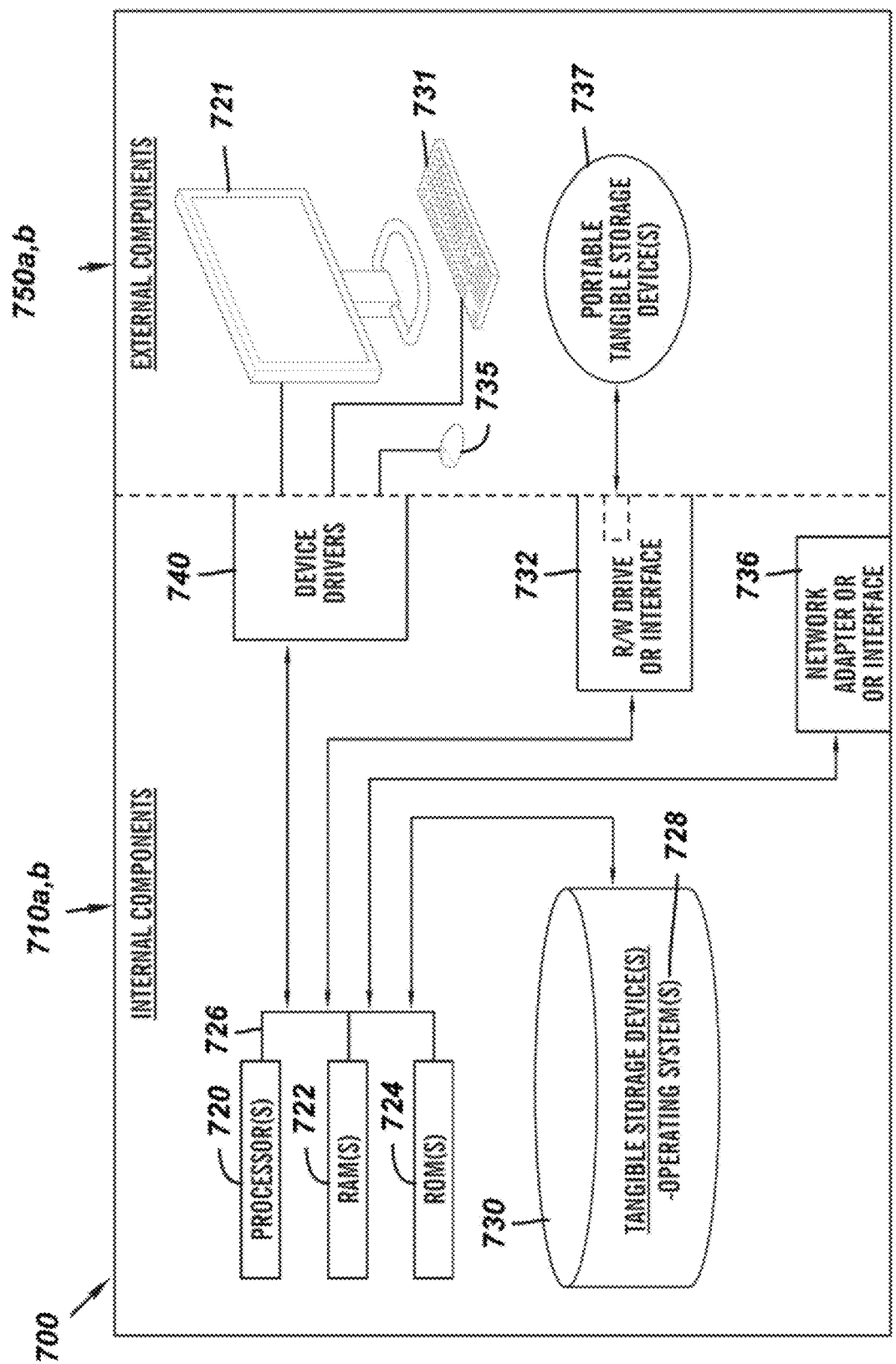
FIG. 4 is a block diagram of the system architecture of the program for automatically detecting inappropriate content associated with a potential post and providing feedback and suggestions based on the detected inappropriateness according to one embodiment.

FIG. 4 is a block diagram 700 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 710, 750 is representative of any electronic device capable of executing machine-readable program instructions. Data processing system 710, 750 may be representative of a smart phone, a computer system, PDA, or other electronic devices. Examples of computing systems, environments, and/or configurations that may represented by data processing system 710, 750 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 710 a, b and external components 750 a, b illustrated in FIG. 4. Each of the sets of internal components 710 a, b includes one or more processors 720, one or more computer-readable RAMs 722, and one or more computer-readable ROMs 724 on one or more buses 726, and one or more operating systems 728 and one or more computer-readable tangible storage devices 730. The one or more operating systems 728, the software program 114 (FIG. 1) and the inappropriateness detection program 108A (FIG. 1) in client computer 102 (FIG. 1), and the inappropriateness detection program 108B (FIG. 1) in network server computer 112 (FIG. 1) are stored on one or more of the respective computer-readable tangible storage devices 730 for execution by one or more of the respective processors 720 via one or more of the respective RAMs 722 (which typically include cache memory). In the embodiment illustrated in FIG. 4, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

Each set of internal components 710 a, b, also includes a R/W drive or interface 732 to read from and write to one or more portable computer-readable tangible storage devices 737 such as a CD-ROM, DVD, memory stick, magnetic tape, magnetic disk, optical disk or semiconductor storage device. A software program, such as an inappropriateness detection program 108A and 108B (FIG. 1), can be stored on one or more of the respective portable computer-readable tangible storage devices 737, read via the respective R/W drive or interface 732, and loaded into the respective hard drive 730.

Each set of internal components 710 a, b also includes network adapters or interfaces 736 such as a TCP/IP adapter cards, wireless Wi-Fi interface cards, or 3G or 4G wireless interface cards or other wired or wireless communication links. The inappropriateness detection program 108A (FIG. 1) and software program 114 (FIG. 1) in client computer 102 (FIG. 1), and the inappropriateness detection program 108B (FIG. 1) in network server 112 (FIG. 1) can be downloaded to client computer 102 (FIG. 1) from an external computer via a network (for example, the Internet, a local area network or other, wide area network) and respective network adapters or interfaces 736. From the network adapters or interfaces 736, the inappropriateness detection program 108A (FIG. 1) and software program 114 (FIG. 1) in client computer 102 (FIG. 1) and the inappropriateness detection program 108B (FIG. 1) in network server computer 112 (FIG. 1) are loaded into the respective hard drive 730. The network may comprise copper wires, optical fibers, wireless transmission, routers, firewalls, switches, gateway computers, and/or edge servers.

Each of the sets of external components 750 a, b can include a computer display monitor 721, a keyboard 731, and a computer mouse 735. External components 750 a, b can also include touch screens, virtual keyboards, touch pads, pointing devices, and other human interface devices. Each of the sets of internal components 710 a, b also includes device drivers 740 to interface to computer display monitor 721, keyboard 731, and computer mouse 735. The device drivers 740, R/W drive or interface 732, and network adapter or interface 736 comprise hardware and software (stored in storage device 730 and/or ROM 724).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
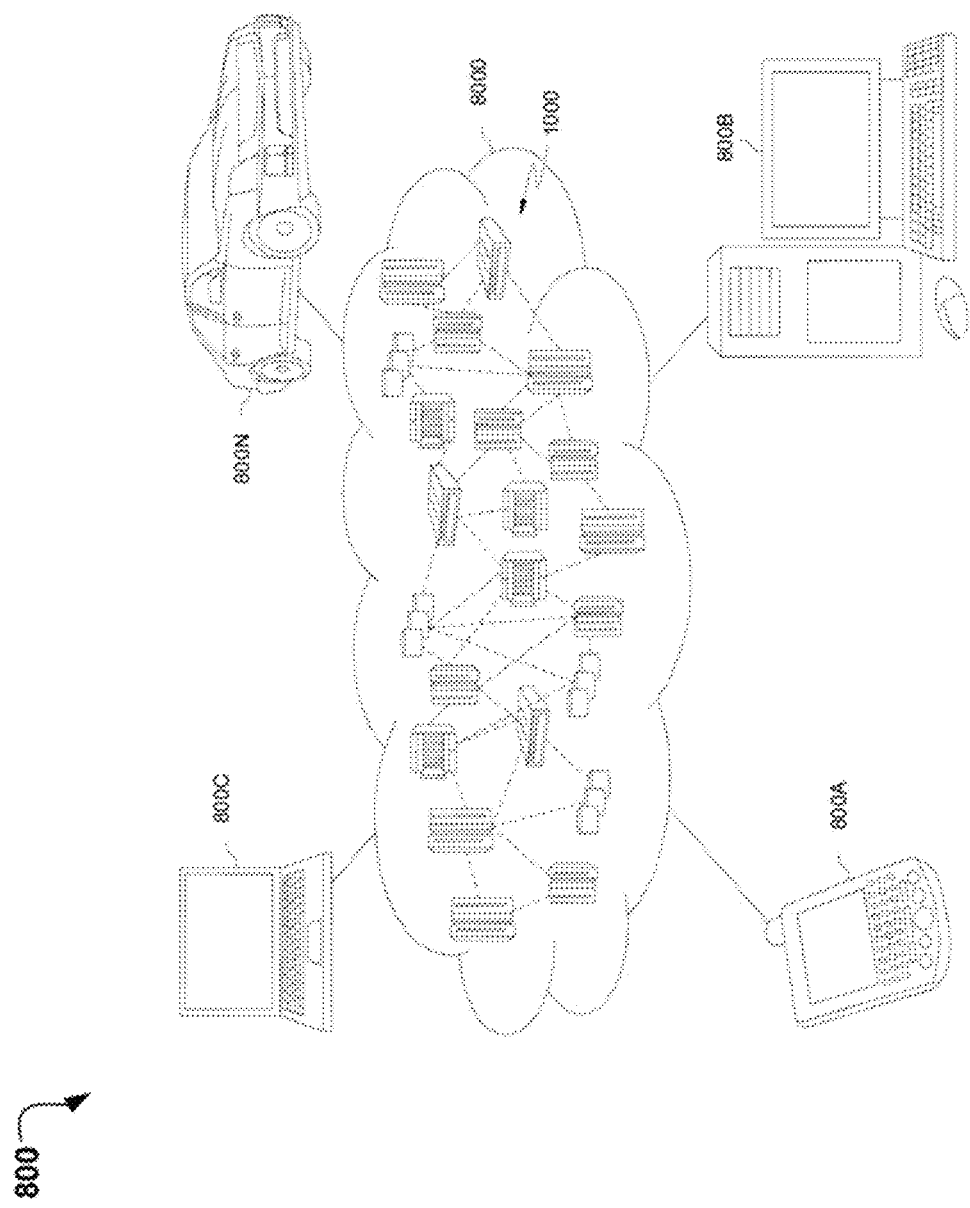
FIG. 5 is a block diagram of an illustrative cloud computing environment including the computer system depicted in FIG. 1, in accordance with an embodiment of the present disclosure.

Referring now to FIG. 5, illustrative cloud computing environment 800 is depicted. As shown, cloud computing environment 800 comprises one or more cloud computing nodes 1000 with which local computing devices used by cloud consumers, such as, for example, personal digital assistant (PDA) or cellular telephone 800A, desktop computer 800B, laptop computer 800C, and/or automobile computer system 800N may communicate. Nodes 1000 may communicate with one another. They may be grouped (not shown) physically or virtually, in one or more networks, such as Private, Community, Public, or Hybrid clouds as described hereinabove, or a combination thereof. This allows cloud computing environment 8000 to offer infrastructure, platforms and/or software as services for which a cloud consumer does not need to maintain resources on a local computing device. It is understood that the types of computing devices 800A-N shown in FIG. 5 are intended to be illustrative only and that computing nodes 100 and cloud computing environment 8000 can communicate with any type of computerized device over any type of network and/or network addressable connection (e.g., using a web browser).

Figure 6:
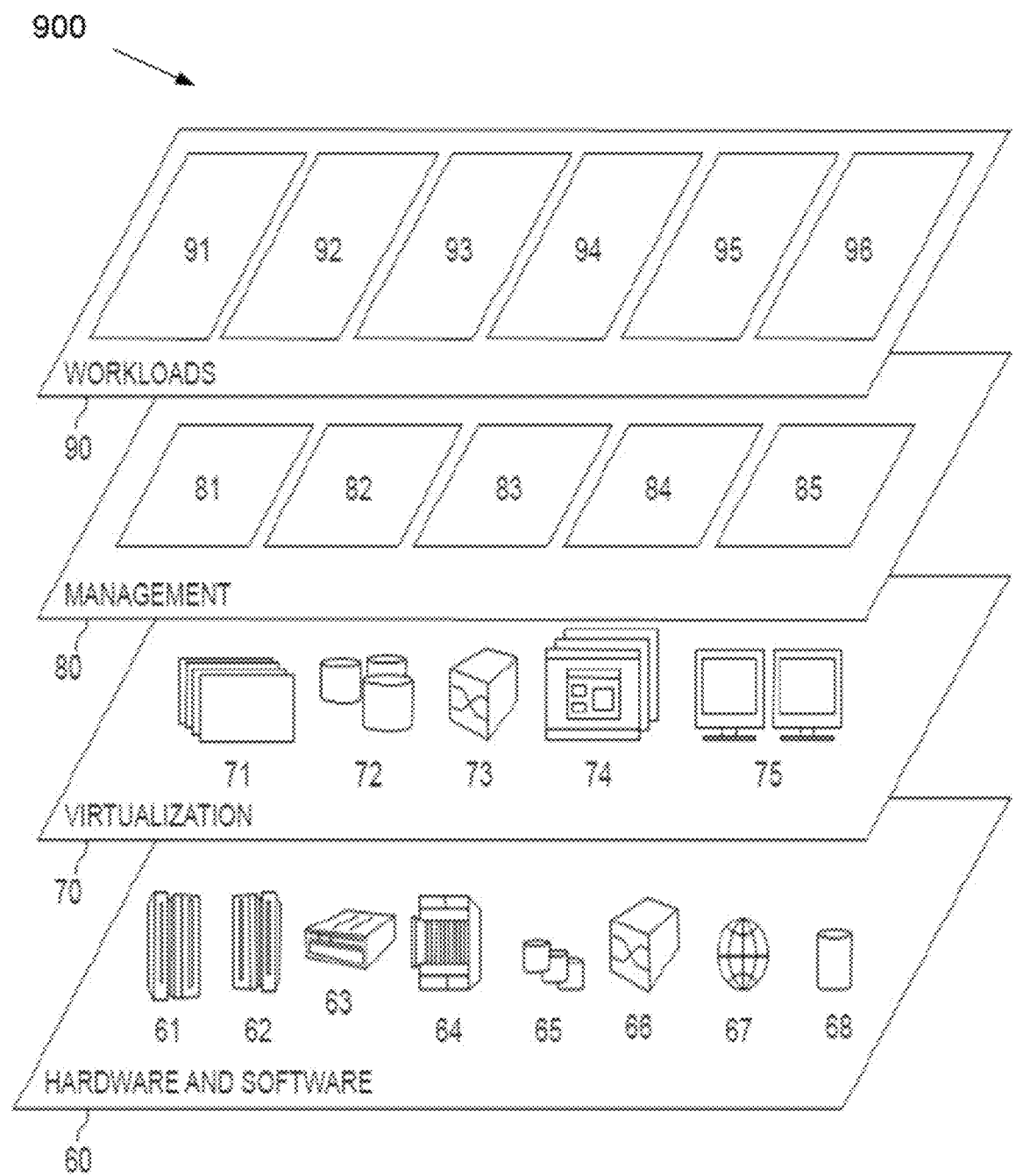
FIG. 6 is a block diagram of functional layers of the illustrative cloud computing environment of FIG. 5, in accordance with an embodiment of the present disclosure.

Referring now to FIG. 6, a set of functional abstraction layers 900 provided by cloud computing environment 800 (FIG. 5) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and inappropriateness detection 96. A inappropriateness detection program 108A, 108B (FIG. 1) may be offered "as a service in the cloud" (i.e., Software as a Service (SaaS)) for applications running on computing devices 102 (FIG. 1) and may automatically detect inappropriate content associated with a potential post based on potential viewers of the potential post and provide feedback and suggestions based on the detected inappropriateness.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically detecting and altering inappropriate content on a computing application, the method comprising:
in response to detecting an attempt to electronically post content on the computing application, wherein detecting the attempt to electronically post the content further comprises receiving a trigger notification from the computing application indicating that the user and that a user using a computer device has initiated posting the content using the computer device, and before allowing the post to be posted:
parsing the content, using natural language processing and computer vision algorithms, to identify one or more parts of the content, wherein the one or more parts of the content comprises at least one of text and an image,
determining whether the one or more parts of the content comprises inappropriate content based on a users context, a public context, and a community context by applying one or more algorithms to the one or more parts of the content based on information associated with one or more computing applications and by predicting whether potential viewers of the one or more parts of the content view the one or more parts as inappropriate based on the applied one or more algorithms,
wherein predicting whether the potential viewers of the one or more parts of the content view the one or more parts as inappropriate from the users context and the community context further comprises using the one or more algorithms to predict user sentiments with regard to the content from a plurality of users by automatically tracking and extracting online information associated with the plurality of users from one or more user accounts, using the natural language processing and the computer vision algorithms to identify and compare a first set of similar content to the content to be posted based on the tracked and extracted online information associated with the plurality of users from the one or more user accounts, and predicting the user sentiments with regard to the content to be posted by determining the user sentiments toward the first set of similar content using the one or more algorithms including the natural language processing algorithms,
wherein predicting whether the potential viewers of the one or more parts of the content view the one or more parts as inappropriate from the public context and the community context further comprises using the one or more algorithms to predict public sentiment with regard to the content by automatically tracking websites and applications and extracting publicly available online information unassociated with the plurality of users and the one or more user accounts, using the natural language processing and the computer vision algorithms to identify and compare a second set of similar content to the content to be posted based on the tracked websites, the tracked applications, and the extracted publicly available online information unassociated with the plurality of users and the one or more user accounts, and predicting the public sentiment with regard to the content to be posted by determining the public sentiment toward the second set of similar content using the one or more algorithms including the natural language processing algorithms, and
generating and displaying both a first set of feedback based on the predicted user sentiment and a second set of feedback based on the predicted public sentiment, wherein generating and displaying the first set of feedback and the second set of feedback further comprises, in response to determining that the one or more parts of the content includes inappropriate content based on the applied one or more algorithms and the potential viewers, generating and displaying revisions altering the attempted post wherein the generated revisions comprise a first set of revisions based on the predicted user sentiment and a second set of revisions based on the predicted public sentiment.

2. The method of claim 1, wherein applying the one or more algorithms based on information associated with the one or more computing applications further comprises:
applying and training a first algorithm to determine whether the parsed content includes inappropriate content based on a first set of extracted and analyzed information associated with the one or more user accounts for a user; and
applying and training a second algorithm to determine whether the parsed content includes inappropriate content based on a second set of extracted and analyzed information comprising the publicly available online information unassociated with the plurality of users.

3. The method of claim 2, wherein the first set of extracted and analyzed information associated with the one or more user accounts is selected from a group comprising at least one of friends and groups associated with the user, previous posts and comments from the user, previous and current posts and comments from the friends of the user, previous and current posts and comments from the groups of the user, posts and comments from one or more communities associated with the user, and a news feeds.

4. The method of claim 2, wherein the second set of extracted and analyzed information is selected from a group comprising at least one of online public news feeds, online public articles, online public comments, online and publicly available images, online public videos, and online public blogs.

5. The method of claim 1, wherein the generated feedback is selected from a group comprising at least one of pointing out the one or more parts of the content determined to be inappropriate on the attempted post, identifying the potential viewers that find the one or more parts of the content inappropriate, identifying previous post and comments that contributed to the determination that the one or more parts of the content are inappropriate, scoring the attempted post, and scoring the one or more parts of the content.

6. The method of claim 1, wherein displaying the generated feedback further comprises:
highlighting the one or more parts of the content determined to be inappropriate on the attempted post and displaying the potential viewers of the attempted post.

7. The method of claim 1, further comprising:
providing a graphical user interface for selecting and deselecting different types of feedback and for receiving user feedback.

8. A computer system for automatically detecting and altering inappropriate content on a computing application, comprising:

one or more processors, one or more computer-readable memories, one or more computer-readable tangible storage devices, and program instructions stored on at least one of the one or more computer-readable tangible storage devices for execution by at least one of the one or more processors via at least one of the one or more computer-readable memories, wherein the computer system is capable of performing a method comprising:

in response to detecting an attempt to electronically post content on the computing application, wherein detecting the attempt to electronically post the content further comprises receiving a trigger notification from the computing application indicating that the content has been entered into a dialogue box associated with the computing application and that a user using a computer device has initiated posting the content using the computer device, and before allowing the post to be posted:

parsing the content, using natural language processing and computer vision algorithms, to identify one or more parts of the content, wherein the one or more parts of the content comprises at least one of text and an image, determining whether the one or more parts of the content comprises inappropriate content based on a users context, a public context, and a community context by applying one or more algorithms to the one or more parts of the content based on information associated with one or more computing applications and by predicting whether potential viewers of the one or more parts of the content view the one or more parts as inappropriate based on the applied one or more algorithms, wherein predicting whether the potential viewers of the one or more parts of the content view the one or more parts as inappropriate from the users context and the community context further comprises using the one or more algorithms to predict user sentiments with regard to the content from a plurality of users by automatically tracking and extracting online information associated with the plurality of users from one or more user accounts, using the natural language processing and the computer vision algorithms to identify and compare a first set of similar content to the content to be posted based on the tracked and extracted online information associated with the plurality of users from the one or more user accounts, and predicting the user sentiments with regard to the content to be posted by determining the user sentiments toward the first set of similar content using the one or more algorithms including the natural language processing algorithms, wherein predicting whether the potential viewers of the one or more parts of the content view the one or more parts as inappropriate from the public context and the community context further comprises using the one or more algorithms to predict public sentiment with regard to the content by automatically tracking websites and applications and extracting publicly available online information unassociated with the plurality of users and the one or more user accounts, using the natural language processing and the computer vision algorithms to identify and compare a second set of similar content to the content to be posted based on the tracked websites, the tracked applications, and the extracted publicly available online information unassociated with the plurality of users and the one or more user accounts, and predicting the public sentiment with regard to the content to be posted by determining the public sentiment toward the second set of similar content using the one or more algorithms including the natural language processing algorithms, and generating and displaying both a first set of feedback based on the predicted user sentiment and a second set of feedback based on the predicted public sentiment, wherein generating and displaying the first set of feedback and the second set of feedback further comprises, in response to determining that the one or more parts of the content includes inappropriate content based on the applied one or more algorithms and the potential viewers, generating and displaying revisions altering the attempted post wherein the generated revisions comprise a first set of revisions based on the predicted user sentiment and a second set of revisions based on the predicted public sentiment.

9. The computer system of claim 8, wherein applying the one or more algorithms based on information associated with the one or more computing applications further comprises:

applying and training a first algorithm to determine whether the parsed content includes inappropriate content based on a first set of extracted and analyzed information associated with the one or more user accounts for a user; and applying and training a second algorithm to determine whether the parsed content includes inappropriate content based on a second set of extracted and analyzed information comprising the publicly available online information unassociated with the plurality of users.

10. The computer system of claim 9, wherein the first set of extracted and analyzed information associated with the one or more user accounts is selected from a group comprising at least one of friends and groups associated with the user, previous posts and comments from the user, previous and current posts and comments from the friends of the user, previous and current posts and comments from the groups of the user, posts and comments from one or more communities associated with the user, and a news feeds.

11. The computer system of claim 9, wherein the second set of extracted and analyzed information is selected from a group comprising at least one of online public news feeds, online public articles, online public comments, online and publicly available images, online public videos, and online public blogs.

12. The computer system of claim 8, wherein the generated feedback is selected from a group comprising at least one of pointing out the one or more parts of the content determined to be inappropriate on the attempted post, identifying the potential viewers that find the one or more parts of the content inappropriate, identifying previous post and comments that contributed to the determination that the one or more parts of the content are inappropriate, scoring the attempted post, and scoring the one or more parts of the content.

13. The computer system of claim 8, wherein displaying the generated feedback further comprises:

highlighting the one or more parts of the content determined to be inappropriate on the attempted post and displaying the potential viewers of the attempted post.

14. The computer system of claim 8, further comprising:

providing a graphical user interface for selecting and deselecting different types of feedback and for receiving user feedback.

15. A computer program product for automatically detecting and altering inappropriate content on a computing application, comprising:
- one or more tangible computer-readable storage devices and program instructions stored on at least one of the one or more tangible computer-readable storage devices, the program instructions executable by a processor, the program instructions comprising:
- in response to detecting an attempt to electronically post content on the computing application, wherein detecting the attempt to electronically post the content further comprises receiving a trigger notification from the computing application indicating that the content has been entered into a dialogue box associated with the computing application and that a user using a computer device has initiated posting the content using the computer device, and before allowing the post to be posted:
- parsing the content, using natural language processing and computer vision algorithms, to identify one or more parts of the content, wherein the one or more parts of the content comprises at least one of text and an image,
- determining whether the one or more parts of the content comprises inappropriate content based on a users context, a public context, and a community context by applying one or more algorithms to the one or more parts of the content based on information associated with one or more computing applications and by predicting whether potential viewers of the one or more parts of the content view the one or more parts as inappropriate based on the applied one or more algorithms,
- wherein predicting whether the potential viewers of the one or more parts of the content view the one or more parts as inappropriate from the users context and the community context further comprises using the one or more algorithms to predict user sentiments with regard to the content from a plurality of users by automatically tracking and extracting online information associated with the plurality of users from one or more user accounts, using the natural language processing and the computer vision algorithms to identify and compare a first set of similar content to the content to be posted based on the tracked and extracted online information associated with the plurality of users from the one or more user accounts, and predicting the user sentiments with regard to the content to be posted by determining the user sentiments toward the first set of similar content using the one or more algorithms including the natural language processing algorithms,
- wherein predicting whether the potential viewers of the one or more parts of the content view the one or more parts as inappropriate from the public context and the community context further comprises using the one or more algorithms to predict public sentiment with regard to the content by automatically tracking 11 of 28 websites and applications and extracting publicly available online information unassociated with the plurality of users and the one or more user accounts, using the natural language processing and the computer vision algorithms to identify and compare a second set of similar content to the content to be posted based on the tracked websites, the tracked applications, and the extracted publicly available online information unassociated with the plurality of users and the one or more user accounts, and predicting the public sentiment with regard to the content to be posted by determining the public sentiment toward the second set of similar content using the one or more algorithms including the natural language processing algorithms, and
- generating and displaying both a first set of feedback based on the predicted user sentiment and a second set of feedback based on the predicted public sentiment, wherein generating and displaying the first set of feedback and the second set of feedback further comprises, in response to determining that the one or more parts of the content includes inappropriate content based on the applied one or more algorithms and the potential viewers, generating and displaying revisions altering the attempted post wherein the generated revisions comprise a first set of revisions based on the predicted user sentiment and a second set of revisions based on the predicted public sentiment.

16. The computer program product of claim 15, wherein the program instructions apply the one or more algorithms based on information associated with the one or more computing applications further comprises:
- program instructions to apply and train a first algorithm to determine whether the parsed content includes inappropriate content based on a first set of extracted and analyzed information associated with the one or more user accounts for a user; and
- program instructions to apply and train a second algorithm to determine whether the parsed content includes inappropriate content based on a second set of extracted and analyzed information comprising the publicly available online information unassociated with the plurality of users.

17. The computer program product of claim 16, wherein the first set of extracted and analyzed information associated with the one or more user accounts is selected from a group comprising at least one of friends and groups associated with the user, previous posts and comments from the user, previous and current posts and comments from the friends of the user, previous and current posts and comments from the groups of the user, posts and comments from one or more communities associated with the user, and a news feeds.

18. The computer program product of claim 16, wherein the second set of extracted and analyzed information is selected from a group comprising at least one of online public news feeds, online public articles, online public comments, online and publicly available images, online public videos, and online public blogs.

19. The computer program product of claim 15, wherein the generated feedback is selected from a group comprising at least one of pointing out the one or more parts of the content determined to be inappropriate on the attempted post, identifying the potential viewers that find the one or more parts of the content inappropriate, identifying previous post and comments that contributed to the determination that the one or more parts of the content are inappropriate, scoring the attempted post, and scoring the one or more parts of the content.

20. The computer program product of claim 15, wherein displaying the generated feedback further comprises:
- highlighting the one or more parts of the content determined to be inappropriate on the attempted post and displaying the potential viewers of the attempted post.

* * * * *